United States Patent
Law et al.

(10) Patent No.: US 8,761,196 B2
(45) Date of Patent: Jun. 24, 2014

(54) FLEXIBLE INPUT/OUTPUT DEVICES FOR USE IN PROCESS CONTROL SYSTEMS

(75) Inventors: Gary Keith Law, Georgetown, TX (US); Trevor Duncan Schleiss, Austin, TX (US); Kent Burr, Round Rock, TX (US); Thomas W. Snead, Austin, TX (US); Ronald Dean Eddie, Dripping Springs, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 795 days.

(21) Appl. No.: 11/540,063

(22) Filed: Sep. 29, 2006

(65) Prior Publication Data

US 2008/0080395 A1   Apr. 3, 2008

(51) Int. Cl.
| | |
|---|---|
| *H04J 3/00* | (2006.01) |
| *G06F 15/173* | (2006.01) |
| *H04L 12/24* | (2006.01) |
| *G05B 19/418* | (2006.01) |

(52) U.S. Cl.
CPC ........ *G05B 19/4186* (2013.01); *H04L 41/0803* (2013.01); *G05B 2219/31181* (2013.01)
USPC .......................................... 370/464; 709/243

(58) Field of Classification Search
None
See application file for complete search history.

(56) References Cited

U.S. PATENT DOCUMENTS

| | | | |
|---|---|---|---|
| 5,549,137 A | 8/1996 | Lenz et al. | |
| 5,558,115 A | 9/1996 | Lenz et al. | |
| 5,573,032 A | 11/1996 | Lenz et al. | |
| 5,682,476 A | 10/1997 | Tapperson et al. | |
| 5,706,007 A | 1/1998 | Fragnito et al. | |
| 5,793,963 A | 8/1998 | Tapperson et al. | |
| 5,796,721 A | 8/1998 | Gretta, Jr. | |
| 5,828,851 A | 10/1998 | Nixon et al. | |
| 5,922,044 A | 7/1999 | Banthia | |
| 6,009,274 A | 12/1999 | Fletcher et al. | |
| 6,034,970 A | 3/2000 | Levac et al. | |
| 6,044,407 A | 3/2000 | Jones et al. | |
| 6,047,222 A | 4/2000 | Burns et al. | |
| 6,085,243 A | 7/2000 | Fletcher et al. | |
| 6,098,116 A * | 8/2000 | Nixon et al. | 709/220 |
| 6,108,782 A | 8/2000 | Fletcher et al. | |
| 6,112,241 A | 8/2000 | Abdelnour et al. | |

(Continued)

FOREIGN PATENT DOCUMENTS

| | | |
|---|---|---|
| CN | 1273647 | 11/2000 |
| JP | 10042380 | 2/1998 |

(Continued)

OTHER PUBLICATIONS

Netx, "Netx networx on chip," Mar. 2006, 5 pages.

(Continued)

*Primary Examiner* — Steven H Nguyen
(74) *Attorney, Agent, or Firm* — Hanley, Flight & Zimmerman, LLC

(57) ABSTRACT

Methods, apparatus and articles of manufacture are disclosed that provide flexible input/output device communications in a process control system. In one example, a process control system controls a plurality of field devices. The process control system includes a control device and a communications protocol component. The communications protocol component has at least one communications channel that is selectively configurable to use at least a first or second communications protocol and to communicate with at least one of the field devices.

68 Claims, 6 Drawing Sheets

(56) References Cited

U.S. PATENT DOCUMENTS

| | | | |
|---|---|---|---|
| 6,124,806 | A | 9/2000 | Cunningham et al. |
| 6,128,551 | A | 10/2000 | Davis et al. |
| 6,222,855 | B1 | 4/2001 | Kimber et al. |
| 6,234,111 | B1 | 5/2001 | Ulman et al. |
| 6,272,400 | B1 * | 8/2001 | Jankins et al. ............... 700/282 |
| 6,377,859 | B1 | 4/2002 | Brown et al. |
| 6,434,157 | B1 | 8/2002 | Dube' et al. |
| 6,446,202 | B1 | 9/2002 | Krivoshein et al. |
| 6,449,715 | B1 * | 9/2002 | Krivoshein ....................... 713/1 |
| 6,618,630 | B1 | 9/2003 | Jundt et al. |
| 6,738,388 | B1 | 5/2004 | Stevenson et al. |
| 6,904,327 | B2 | 6/2005 | Balakrishnan et al. |
| 7,024,508 | B2 | 4/2006 | Gros et al. |
| 7,039,675 | B1 | 5/2006 | Kato |
| 7,228,129 | B1 * | 6/2007 | Ward et al. .................... 455/423 |
| 7,246,194 | B2 * | 7/2007 | Train et al. .................... 710/311 |
| 7,263,362 | B1 | 8/2007 | Young et al. |
| 2002/0010562 | A1 | 1/2002 | Schleiss et al. |
| 2003/0099229 | A1 | 5/2003 | Tretter et al. |
| 2003/0236937 | A1 * | 12/2003 | Barros De Almeida et al. ............................ 710/305 |
| 2004/0073402 | A1 * | 4/2004 | DelaCruz et al. ............ 702/183 |
| 2004/0184479 | A1 | 9/2004 | Yamauchi et al. |
| 2004/0255017 | A1 | 12/2004 | Jurisch et al. |
| 2005/0240675 | A1 | 10/2005 | Caspers et al. |
| 2006/0031577 | A1 * | 2/2006 | Peluso et al. .................. 709/243 |
| 2007/0019560 | A1 * | 1/2007 | Brewer et al. ................. 370/252 |
| 2007/0057783 | A1 * | 3/2007 | Reller .......................... 340/538 |

FOREIGN PATENT DOCUMENTS

| | | |
|---|---|---|
| JP | 2001016664 | 1/2001 |
| JP | 2004094835 | 3/2004 |
| WO | 9919782 | 4/1999 |
| WO | 0213036 | 2/2002 |
| WO | 2004010645 | 1/2004 |

OTHER PUBLICATIONS

Emerson Process Management, "DeltaV Digital Automation System," Aug. 2005, 32 pages.
Control, "Creating the Digital Plant," Jan. 2002, 14 pages.
International Search Report for WO0213036A1, 2 pages.
Office Action, issued by the United States Patent and Trademark Office on Mar. 11, 2010, in connection with U.S. Appl. No. 10/863,610, 19 pages.
Advisory Action Before the Filing of an Appeal Brief, issued by the United States Patent and Trademark Office on Dec. 23, 2009, in connection with U.S. Appl. No. 10/863,610, 3 pages.
Office Action, issued by the United States Patent and Trademark Office on Aug. 20, 2009, in connection with U.S. Appl. No. 10/863,610, 16 pages.
Office Action, issued by the United States Patent and Trademark Office on Jan. 30, 2009, in connection with U.S. Appl. No. 10/863,610, 14 pages.
Advisory Action Before the Filing of an Appeal Brief, issued by the United States Patent and Trademark Office on Dec. 23, 2008, in connection with U.S. Appl. No. 10/863,610, 3 pages.
Office Action, issued by the United States Patent and Trademark Office on Jun. 25, 2008, in connection with U.S. Appl. No. 10/863,610, 16 pages.
Office Action, issued by the United States Patent and Trademark Office on Dec. 19, 2007, in connection with U.S. Appl. No. 10/863,610, 15 pages.
European Office Action issued by the European Patent Office on Sep. 14, 2009, in connection with European application No. 05 757 169.7-2206, 3 pages.

English Language version Decision of Rejection issued by the State Intellectual Property Office of China, on Nov. 20, 2009, in connection with Chinese application No. 200580017942.X, 20 pages.
English Language Notification of the Third Office Action, issued by the State Intellectual Property of China, on May 15, 2009, in connection with Chinese application No. 200580017942.X, 7 pages.
English Language Notification of the Second Office Action, issued by the State Intellectual Property of China, on Nov. 21, 2008, in connection with Chinese application No. 200580017942.X, 11 pages.
"PCT International Search Report," issued by the International Searching Authority on Oct. 4, 2005, in connection with International application No. PCT/2005/019742, 4 pages.
"PCT Written Opinion of the International Searching Authority," issued by the International Searching Authority on Oct. 4, 2005, in connection with International application No. PCT/2005/019742, 6 pages.
Hoon et al., "Foundation Fieldbus High Speed Ethernet (HSE) Implementation," International Symposium on Intelligent Control, IEEE, Oct. 27-30, 2002, 6 pages.
Pal et al., "Development of Network Capable Smart Transducer Interface for Traditional Sensors and Actuators," www.sciencedirect.com, Elsevier Science B.V., Feb. 19, 2004, 7 pages.
Sauter et al., "Achievement of Secure Internet Access to Fieldbus Systems," Microprocessors and Microsystems 26, www.elsevier.com/locate/micpro, Elsevier Science B.V., May 17, 2002, 9 pages.
Issue 3: Selecting Digicon Systems, Mar. 2000, 5 pages.
Rochez, "Examples of an Industrial Fieldbus Adapter for a Custom Front-End Board," Http:/itcowww.cern.ch/~rochez, Oct. 11, 1999, 13 pages.
"MB700 Modbus RTU and TCP/IP Processor," retrieved from the Internet: http://www.smar.com/products/MB700.asp, Nov. 14, 2002, 3 pages.
"FS1122 Modbus to DeviceNet Gateway Product Manual," Fieldbus Specialist, http://www.fieldbus.com.au, Undated, 8 pages.
Notice of Reasons for Rejection, issued by the Japanese Intellectual Property Office in connection with Japanese Patent Application No. 2007-252056 on Jan. 24, 2012, 2 pages.
The Notification of the Fourth Office Action, issued by the State Intellectual Property Office of P.R. China in connection with Chinese Patent Application No. 200710151696.8, on Feb. 16, 2013, 5 pages.
"Fifth Office Action," issued by the State Intellectual Property Office of the Peoples' Republic of China on Jun. 5, 2013, in connection with Chinese Application No. 200710151696.8, 4 pages.
The Notification of the Third Office Action, issued by the State Intellectual Property Office of P.R. China, on May 25, 2012, in connection with Chinese Application No. 200710151696.8, 9 pages.
Examiner's Report under Section 18(3), issued by the Intellectual Property Office of the United Kingdom, in connection with British Application No. GB0719120.8, on Jun. 16, 2011, 1 page.
Japanese Office Action, issued by the Japanese Intellectual Property Office in connection with Japanese patent application No. 2007-252056, on Jul. 31, 2012, 2 pages.
The Notification of the Second Office Action, issued by the State Intellectual Property Office of P.R. China, in connection with Chinese patent application No. 200710151696.8, on Aug. 17, 2011, 10 pages.
"The Notification of the First Office Action," issued by the State Intellectual Property Office of P.R. China, in connection with Chinese Application No. 200710151696.8, issued on Oct. 9, 2010, 11 pages.
"Examination Report under Section 18(3)," issued by Intellectual Property Office of the United Kingdom in connection with British Application No. GB0719120.8, on Feb. 28, 2011, 2 pages.
English Translation of the Notification of the Sixth Office Action, issued by the State Intellectual Property Office of the P.R. China, in connection with Chinese Patent Application No. 200710151696.8, on Nov. 27, 2013, 7 pages.

* cited by examiner

FLEXIBLE INPUT/OUTPUT DEVICES FOR USE IN PROCESS CONTROL SYSTEMS

FIELD OF THE DISCLOSURE

This disclosure relates generally to process control systems and, more particularly, to flexible input/output devices for use in process control systems.

BACKGROUND

Process control systems are widely used in factories and/or plants in which products are manufactured or processes are controlled (e.g., chemical manufacturing, power plant control, etc.) Process control systems are also used in the harvesting of natural resources such as, for example, oil and gas drilling and handling processes, etc. Virtually any manufacturing process, resource harvesting process, etc. can be automated through the application of one or more process control systems.

The manner in which process control systems are implemented has evolved over the years. Older generations of process control systems were typically implemented using dedicated, centralized hardware. However, modern process control systems are typically implemented using a highly distributed network of workstations, intelligent controllers, smart field devices, and the like, some or all of which may perform a portion of an overall process control strategy or scheme. In particular, most modern process control systems include smart field devices and other process control components that are communicatively coupled to each other and/or to one or more controllers via one or more digital data busses. Of course, many of these modern process control systems may also include non-smart field devices such as, for example, 4-20 milliamp (mA) devices, 0-10 volts direct current (VDC) devices, etc., which are typically coupled directly to controllers as opposed to a shared digital data bus or the like.

In any event, field devices include, for example, input devices (e.g., devices such as sensors that provide status signals that are indicative of process control parameters such as, for example, temperature, pressure, flow rate, etc.), as well as control operators or actuators that perform actions in response to commands received from controllers and/or other field devices. For example, a controller may send signals to a valve to increase pressure or flow, to a heater or chiller to change a temperature, to a mixer to agitate ingredients in a process control system, etc.

One particularly important aspect of process control system design involves the manner in which field devices are communicatively coupled to each other, controllers and other systems or devices within a process control system. In general, the various communication channels, links and paths that enable the field devices to function within the process control system are commonly collectively referred to as an input/output ("I/O") communication network.

Traditionally, many communication protocols and busses have been used to interface smart field devices to a controller or other control device. The control device (e.g., a controller) typically includes or is coupled to an I/O device having a communications protocol component, often termed the "master," which activates and exchanges data with the smart field devices, often termed "slave" devices. In these known systems, the master must be configured to conform to the device specifications of the field devices (e.g., the particular communications protocol used by the field device). Consequently, there was a requirement for the user to always choose a particular protocol or set of devices supported by the manufacturer of the I/O device and/or to use different I/O devices or cards for each of the specific communication protocols needed to communicate with the various field devices used.

SUMMARY

In accordance with one aspect, a process control system, which controls a plurality of field devices, includes a control device and a communications protocol component. The communications protocol component has at least one communications channel that is selectively configurable to use a first or second communications protocol and to communicate with at least one of the field devices.

In accordance with another aspect, an input/output device for use in a process control system includes at least a first communications channel to establish communications between at least one of a plurality of field devices and a control device. The communications are established using at least one of a first available communications protocol or a second available communications protocol.

In accordance with yet another aspect, a method of controlling a plurality of field devices includes initializing an input/output ("I/O") device that includes a communications protocol component having at least one communications channel. The method further includes configuring the at least one communications channel to use at least a first available communications protocol or a second available communications protocol. In addition, the method includes communicating with one of the field devices via the at least one communications channel using the at least first communications protocol or second communications protocol.

In accordance with still another aspect, a method of using an input/output device in a process control system to communicate using a plurality of communication protocols includes configuring at least a first one of a plurality of communication channels on the input/output device to communicate with at least one of a plurality of field devices using a first communications protocol. The method further includes configuring at least a second one of the plurality of communication channels on the input/output device to communicate with at least another one of the plurality of field devices using a second communications protocol.

DETAILED DESCRIPTION

Figure 1:
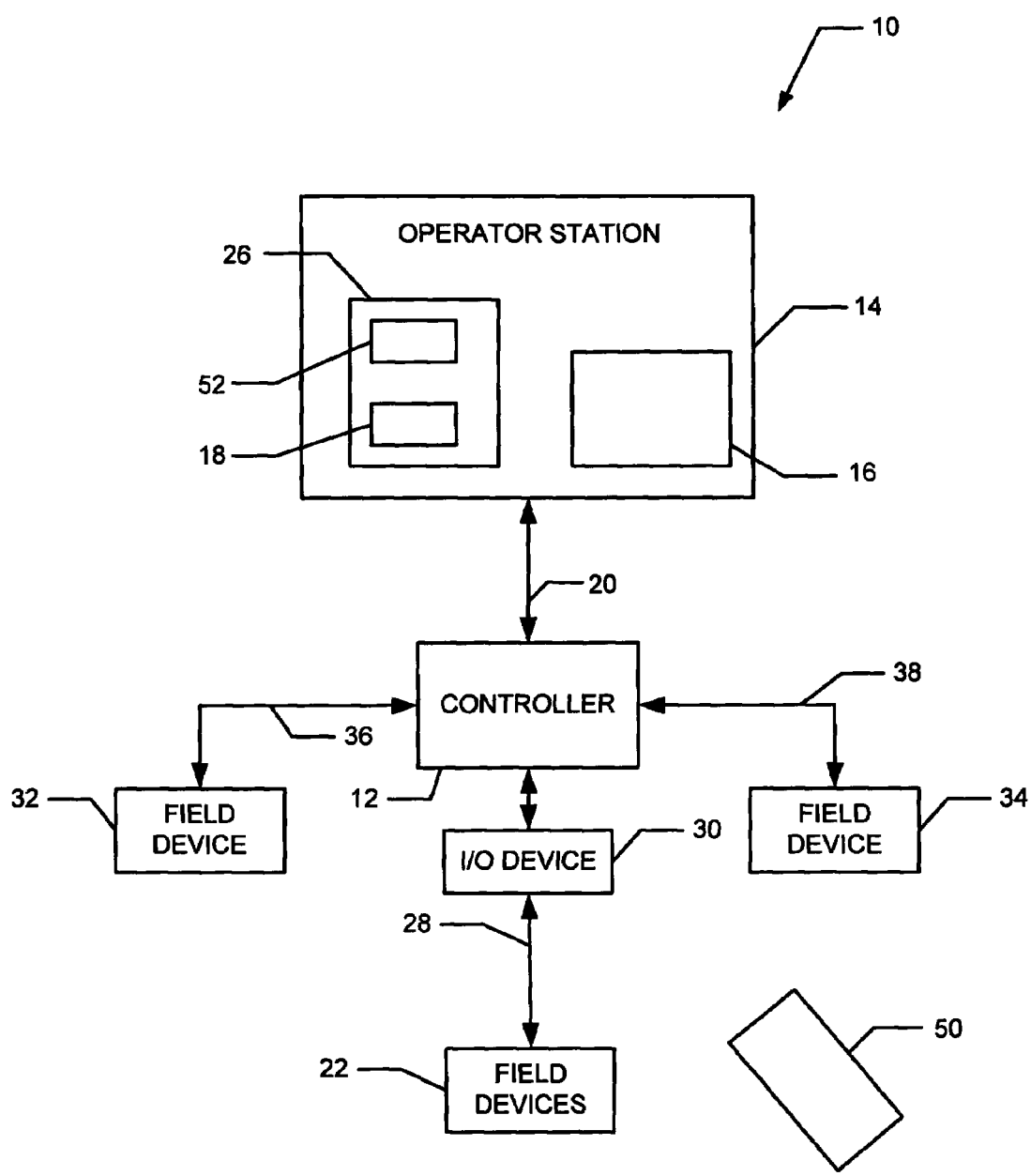
FIG. 1 a block diagram of an example process control system that uses the flexible input/output devices and methods described herein.

Although the following describes example apparatus and systems including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example apparatus and systems, persons of ordinary skill in the art will readily appreciate that the examples provided are not the only way to implement such apparatus and systems.

As used herein the phrase "input/output device" (i.e., "I/O device") includes any hardware and/or software used to communicatively couple one or more field devices to a process controller. In some implementations, the I/O device may be a separate card (i.e., an I/O card) that is coupled to the controller via a bus. In other implementations, some or all of the functionality of the I/O device may be integral with the controller. Thus, the phrases "I/O device" and "I/O card" may be used interchangeably throughout the description provided herein.

Typically I/O devices or cards are programmed or configured so that a process controller may communicate with field devices via a single specified communications protocol. These known I/O cards enable communication with a plurality of field devices that use the specified protocol. If it is desired to enable the controller to communicate with a variety of field devices that use different communication protocols, a separate I/O card is typically required for each of the different communication protocols used. However, this can significantly increase the costs associated with installation, configuration, operation and maintenance of a system in which a variety of communication protocols are used to communicate with a plurality of different field devices.

In some such systems, for example, utilization of the I/O device(s) and/or the I/O cards may be relatively low such that each of a number of I/O cards may be needed to communicate with relatively few field devices that use a particular communications protocol. In other words, while each I/O card may have the capability to communicate with a much larger number of field devices, a much smaller number of field devices is actually in communication with each I/O card because a separate I/O card is used for each type of communications protocol used by the field devices. Further, adding and/or replacing one or more field devices with one or more field devices that use a communications protocol that is different than any of those supported by the I/O cards in an I/O device requires the installation and configuration of yet another I/O card to support that further communications protocol.

Unlike known systems and methods, the example systems and methods described herein may be used to communicatively couple a controller to one or more field devices using a variety of protocols via a single I/O device or card. More specifically, as described herein, an example process control system that may be used to control a plurality of field devices includes an I/O device or card that has a master or communications protocol component. The communications protocol component includes a plurality of reconfigurable components, each of which corresponds to an I/O port. Each reconfigurable component is configurable to use one of a plurality of communication protocols depending on the specification of the associated field device with which the controller communicates via that I/O port. Thus, in this manner, different communication protocols may be used simultaneously to communicate with different field devices via the same I/O card or device. When it is desirable to change the field device(s) coupled to an I/O port, the reconfigurable component associated with the I/O port may be, if needed, reconfigured to use a different communications protocol to communicate with the new field device(s). Thus, the communications protocol is selectable within the I/O device or card on a per connection (e.g., I/O port) basis. As a result, the I/O device or card provides flexibility to the process control system in that many field devices that communicate via a plurality of different communication protocols may be coupled to the process control system via a single I/O device or card.

The reconfigurable components of the communications protocol component may be configured using a configuration application that is associated with the process control system. The configuration application may be created using one (i.e., a single) tool, such as an application configured to be executed via a workstation. In addition, the configuration application may provide beneficial attributes, including that it is incorporated within an object-oriented database and is self-documenting. The configuration application may also provide information related to the sensing of the field devices by an I/O device or card, may be configured to assign and/or clear address assignments of the field devices, and may be configured to use a device definition to describe an input, an output, or a parameter associated with a particular field device. Still further, the configuration application may be configured to generate signal tags with labels related to the device definition, may be configured to generate device alerts on a per field device basis for any one of a plurality of communication protocols used to communicate with the field devices, and may support pass-through communications from a workstation-based device configuration application. Additionally, a handheld configuration tool may be used to assign addresses to the field devices.

Now turning to FIG. 1, an example distributed control system or process control system 10 uses the flexible input/output (I/O) devices and methods described herein. As shown in FIG. 1, the process control system 10 includes a control device or controller 12, and a workstation for example a configuration engineer or operator station 14, which may be coupled to the controller 12 via a bus or network such as, for example, a local area network (LAN) 20, which is commonly referred to as an application control network (ACN). The operator station 14 may be implemented using one or more workstations or any other suitable computer systems or processing units. For example, the operator station 14 could be implemented using single processor personal computers, single or multi-processor workstations, etc. In addition, the LAN 20 may be implemented using any desired communication medium and protocol. For example, the LAN 20 may be based on a hardwired or wireless Ethernet communication scheme, which is well known and, thus, is not described in greater detail herein. However, as will be readily appreciated by those having ordinary skill in the art, any other suitable communication media and protocol(s) could be used.

The operator station 14 includes a memory 26 for storing a process control configuration system 52, which is alternatively referred to as a process control configuration routine, application or tool 52 as is described in greater detail below in connection with FIGS. 3-5. The operator station 14 also includes a processor 16 that executes the configuration tool 52. The configuration tool 52 may be used by one or more operators, engineers or other users, for example, to document the types and locations of field devices used in the process control system 10 and/or to review or change the configuration of the process control system 10. The configuration tool 52 may also be used to document information pertaining to individual control elements such as the controller 12, an I/O device or card 30, one or more of the field devices used within the system 10 and any functions or sub-routines within the process control routine(s) or process control software to be executed by the controller 12 and/or the field devices during runtime. Furthermore, the configuration tool 52 may communicate with the controller 12 to download configuration information and/or receive and display information pertaining to the process during operation of the process control system 10.

The operator station 14 may also include a process control configuration database 18 to store the process control configuration information used by the configuration tool 52. The database 18 may be stored in the memory 26 or in any other desired memory communicatively coupled to the process control system 10.

The controller 12 may be coupled to a plurality of smart field devices 22 via a plurality of communication links or channels 28, which may be implemented as digital data buses, and the I/O card or device 30, which may be referred to as a flexible I/O device, card or interface card. As described in greater detail in connection with FIG. 2 below, the flexible I/O device or interface card 30 provides a plurality of connections or ports 48, each of which corresponds to one of the communication channels 28. Each of the connections or communication channels 28 may be individually configured to use any one of a plurality of available communication protocols. For example, each of the communication channels 28 may be individually configured to use one of the Fieldbus, Profibus, HART®, Honeywell DE, Foxboro FoxCom®, or any other communication protocols. As a result, in operation, the flexible I/O device 30 may simultaneously use a combination of different communication protocols to communicate with the field devices 22 via the communication channels 28. Additionally, it should be understood that each of the communication channels 28 may be coupled to multiple ones of the field devices 22 that communicates with the I/O device 30 using the same communications protocol. For example, some of the smart field devices 22 may be Fieldbus compliant valves, actuators, sensors, etc., in which case those smart field devices 22 communicate via one or more of the communication channels 28 configured to use the well-known Fieldbus protocol. Of course, other types of smart field devices and communication protocols could be used instead or in addition to those employing the Fieldbus protocol. For example, the smart field devices 22 could include Profibus or HART® compliant devices that communicate via the communication channels 28 configured to use the well-known Profibus and HART® communication protocols. Still further, additional I/O devices and redundant I/O devices (similar or identical to the I/O device 30) may be coupled to the controller 12 to enable additional groups of smart field devices, which may be Fieldbus devices, HART® devices, etc., to communicate with the controller 12.

In addition to coupling various I/O devices 30, which are configurable to use different combinations of communication protocols, to the controller 12, the example I/O device 30 and any additional I/O device(s) may also communicate via the communication channels 28 using any variety and/or combination of the communication protocols named herein, and/or any other known or later developed communication protocols.

Thus, the flexible I/O device 30 enables the mixing and matching of field devices, which may be made by different manufacturers and/or which employ different communication protocols, on the ports, connections or communication channels of the I/O device 30. Such flexibility may enable an optimum implementation (e.g., selection of a combination of field devices based on the performance/cost characteristics of the devices rather than having to select devices that all use a single communications protocol) and the ability to readily replace one or more of the field devices 22 with field devices that communicate via different communication protocol(s) without incurring additional cost or needing to install different or additional I/O devices. For example, the flexible I/O device 30 could be configured to simultaneously that support Honeywell DE protocol on several channels or ports and the HART® protocol on other channels or ports. Similarly, the I/O device 30 could be configured to simultaneously support the Foxboro FoxCom® protocol on several channels or ports and the HART® protocol on other channels or ports. Furthermore, the example process system 10 allows for the use of analog communications (e.g., Analog 4-20 mA) with the field devices 22 if desired, as well as combination analog and digital communications if supported by the protocol that is implemented on one of the channels 28.

Furthermore, as mentioned above and described in greater detail below, in addition to supporting multiple communication protocols on different ones of the communication channels 28 or associated ports 48, the flexible I/O device 30 enables each of the communication channels 28 or ports 48 to be independently reconfigured. Thus, a communications channel 28 that is configured to use one communications protocol may later be programmed to use a second different communications protocol. Thus, when one of the field devices 22 fails, needs to be removed for maintenance, or is otherwise replaced, the failed field device may be decoupled or removed from the process control system 10, and a replacement field device may be coupled to the process control system 10 via the same communications channel 28, i.e., into the same port of the I/O device 30. In the case where the replacement field device 22 uses a communications protocol that is different than that used by the replaced, failed field device, the communications channel 28 via which the replacement field device communicates with the I/O device 30 can be reconfigured to use the communications protocol used by the replacement field device. For example, a system operator, configuration engineer or other user may use the configuration tool 52 to reconfigure the communications channel 28 to communicate with the replacement field device. The reconfiguration of any one of the communication channels 28 does not affect the operation of any other one of the communication channels 28.

In addition to the smart field devices 22, one or more non-smart field devices 32 and 34 may also be communicatively coupled to the controller 12. The non-smart field devices 32 and 34 may be, for example, conventional 4-20 mA or 0-10 VDC devices that communicate with the controller 12 via respective hardwired links 36 and 38.

The controller 12 may be, for example, a DeltaV™ controller sold by Fisher-Rosemount Systems, Inc. and Emerson Process Management™. However, any other controller may be used instead. Further, while only one controller is shown in FIG. 1, additional controllers of any desired type or combination of types could be coupled to the LAN 20. In operation, the controller 12 may perform one or more process control routines associated with the process control system 10 that have been generated by a system engineer or other system operator using the operator station 14 and which have been downloaded to and instantiated in the controller 12 and/or the field devices 22.

FIG. 1 also shows that the example process control system 10 may include a remote operator station or communications device 50, which may be, for example, a handheld configuration tool that supports services related to installation and/or maintenance of the field devices 22. The example handheld configuration tool 50 may be implemented using an AS-i (Actuator Sensor Interface) bus and/or any other hardware platform, communications protocol, etc. Furthermore, with some communication protocols such as, for example, the HART® protocol, the handheld configuration tool 50 may have additional functional capabilities such as, for example, the ability to serve as a secondary master or communications protocol component.

Furthermore, as discussed in greater detail below, in operation, the handheld configuration tool 50 may be used to assign addresses to the field devices 22. Typically, field devices 22 are provided by the manufacturer with a default address assigned thereto. Consequently two field devices (e.g., field devices 22a and 22b of FIG. 2), which may be produced by the same or different manufacturers, may initially have the same address. In the case where two field devices coupled to the controller 12 have the same address, the controller 12 cannot communicate with both devices properly because an attempt to send information to one device may result in an unintentional reception of the information at the second device. In addition, the communications protocol may be improperly configured where the two identically addressed devices do not use the same communications protocol. One way to resolve this problem is to use the handheld configuration tool 50 to remotely reassign addresses to the field devices 22 upon coupling the field devices 22 to the process control system 10.

As described above, addresses may be assigned or reassigned to the field devices 22 at the time a field device 22 is added to the process control system 10, or at any other time desired. Assigning addresses to the field devices 22 may be performed offline, for example, with the handheld configuration tool 50, or automatically by the process control system 10 via, for example, the configuration tool 52 and the controller 12. The configuration tool 52 may also provide the capability to clear the address of any one of the field devices 22. The handheld configuration tool 50 may not be needed to assign/clear addresses because the process control system 10 and, specifically, the configuration tool 52, may clear and/or assign addresses to the field devices 22. However, as described above, the handheld configuration tool 50 also facilitates field operations such as, for example, routine maintenance, troubleshooting or repair.

The address of a field device is incorporated into a signal tag, which may be generated by the configuration tool 52 for use with valid inputs and outputs. Thus, the signal tag for a field device may include an address such as, for example, "T101." In addition, the signal tag may include a label. The label is a descriptive term or phrase by which the operator or configuration engineer, maintenance personal, or other user can readily identify the type of device, a specific device, or a type of measurement or reading made by a device associated with the signal. Thus, a label may read, for example, "Boiler Feedwater Temperature." Furthermore, the signal tags may also include definitions associated with the field devices 22. These device definitions provide additional information about a field device. For example, the device definitions may describe at least an input, an output and a parameter associated with each of the particular field devices 22. Such device definitions can be imported into the configurations database 18 in a bulk format, or the user can create device definitions from product descriptions as each of the field device 22 is added to the system 10 or at any other time. Cues, prompts, etc. to facilitate the creation or generation of the device definitions, i.e., defining the inputs, outputs, and parameters, may be provided to the user via the operator station 14 based on the communications profile of the field devices 22, which includes the communication protocol(s) needed to communicate with the field devices 22. Additionally, the configuration tool 52 may use the device definitions to describe the inputs, outputs, and parameters of the field devices 22. The use of such device definitions eliminates user configuration errors. Also, the example process control system 10 may provide a hierarchical view of the network devices based, at least in part, upon the signal tags, i.e., the defined inputs and outputs, the labels and the device definitions. The hierarchical view may be generated automatically.

The example systems and methods described herein also offer other benefits. For example, a user may be alerted to various states or operating conditions of a particular field device on a per device basis, regardless of the communications protocol used to communicate with the device. For example if a certain parameter measured by a field device reaches an unsafe level, the operator may be alerted of the state of the field device and/or of what specific actions to take. In addition, the operator may be alerted to the absence of a field device. For example, during configuration, which is described in greater detail below, an operator may expect a response from a particular field device after sending the field device a specific message. When the expected response is not received by the operator, the operator may be alerted that the field device has failed, is not configured correctly so the field device does not understand the communication, or is otherwise absent or not available.

Further, the system 10 supports pass-through communications from a workstation-based device configuration application. One such example application is the Asset Management Solutions (AMS®) series of software programs provided by Fisher-Rosemount Systems, Inc. and Emerson Process Management™, which provides support to personnel at a manufacturing plant implementing the example process control system 10 in various areas including device configuration, calibration and diagnosis of equipment problems. This allows for device configuration and management such as, for example, changes in the field devices 22, to be handled regardless of the implementation of the host process control system.

The example process control system 10 may also support other digital communication networks in place of analog networks (i.e., for example, those using the 4-20 mA analog signal). Such networks may be digital, bi-directional, multi-drop, serial-bus, communications networks used to link isolated field devices, such as controllers, transducers, actuators and sensors, These networks may include, for example, Profibus PA. These other networks may be supported on a per channel basis to allow for easier migration of field devices to these high speed, all digital communication protocols. The methodology may also be extended to remote terminal units (RTUs) or stand alone controllers such as Fisher Remote Operations Controllers (ROCs), which are general-purpose RTUs designed for a variety of measurement and control applications, or similar devices.

Figure 2:
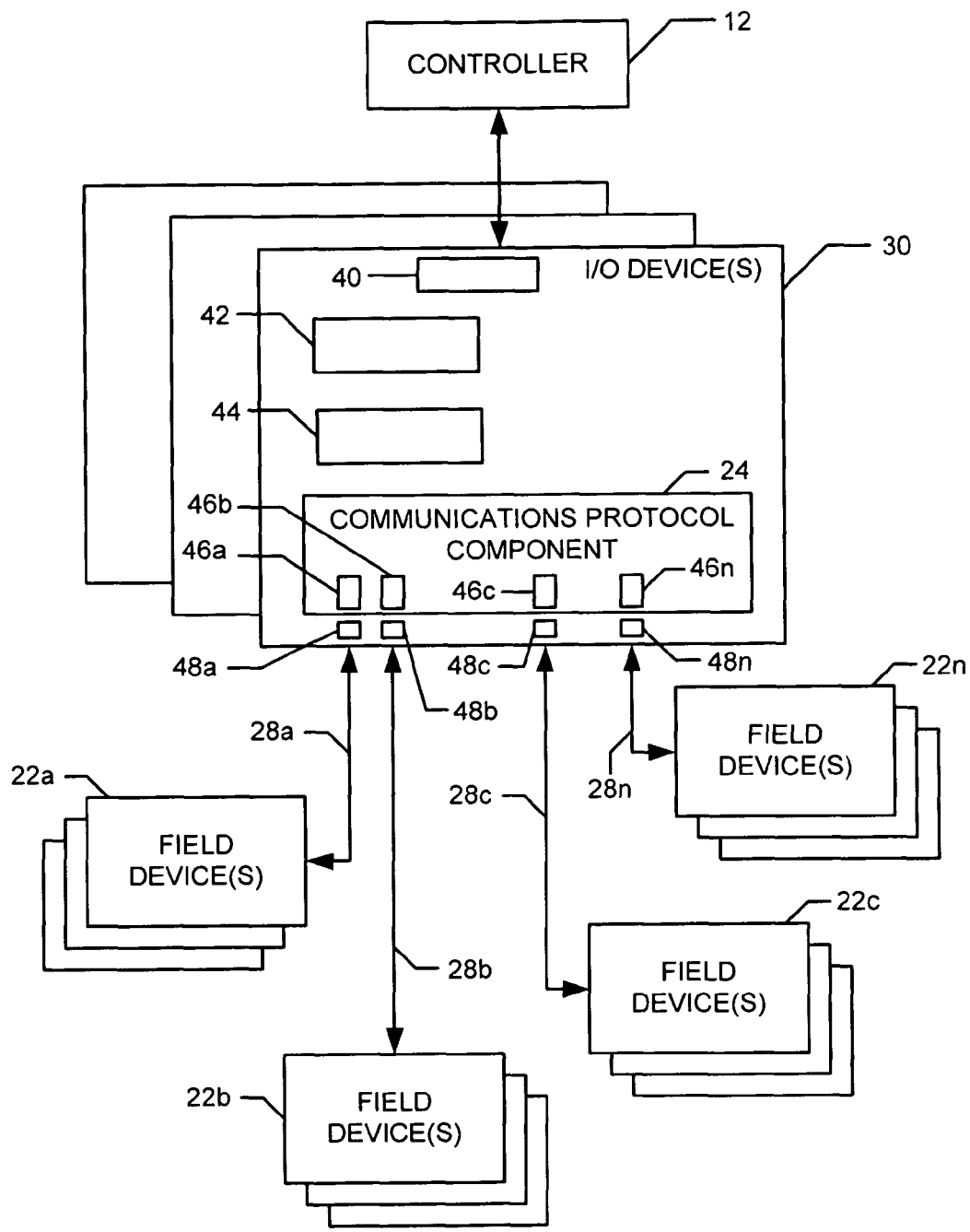
FIG. 2 is a more detailed block diagram of a portion of the example process control system of FIG. 1.

Now turning to FIG. 2, a more detailed portion of the example control system 10 of FIG. 1 is shown. In a DeltaV™ distributed control system, for example, a communications protocol component 24, which may also be referred to as the master, resides on the I/O device 30 coupled to the controller 12, as shown in FIG. 2. Configuration of communication channels 28a, 28b, 28c and 28n, which is also described in greater below, may be performed via a workstation such as, for example, the operator station 14, and the configuration information may be transferred via the network 20 to the controller 12 and the I/O device 30. The I/O device 30 may include a direct human interface, such as push buttons or the like, that enables local field configuration of the communications protocol component 24. In the case where there is no direct human interface to the I/O device 30, the communications protocol component 24 may be configured using the configuration tool 52 associated with the example control system 10 by, for example, extending the functionality of the known DeltaV™ Explorer software of the operator station 14, as described below.

The example I/O device 30 includes a controller interface 40, via which the I/O device 30 communicates with the controller 12, a processor 42 and a memory 44, which operate similarly to the processor 16 and the memory 26 illustrated in and described in connection with FIG. 1. The example I/O device 30 also includes the communications protocol component 24, which has a plurality of reconfigurable communication ports or modules 46a, 46b, 46c and 46n. The reconfigurable communication modules 46a-n correspond to a respective one of the communication channels 28a-n and/or ports 48a-n.

While four reconfigurable communication ports or modules (i.e., 46a-n) and four corresponding communication channels or links (i.e., 28a-n) are shown, more or fewer reconfigurable communication ports or modules and communication channels or links may be used instead. Additionally, multiple I/O devices or cards similar or identical to the I/O device 30 may be coupled to the controller 12 and/or multiple field devices may be coupled to each or any combination of the communication channels 28a-n.

As described in greater detail below, when one of the field devices 22 is coupled to the I/O device 30 via one of the communication channels 28a-n, communication ports 48a-n and modules 46a-n, the configuration tool 52 may be used to configure or reconfigure the one of the modules 46a-n to which the field device 22 is coupled to use the communications protocol used by that field device 22, thereby enabling the controller 12 to communicate with the field device 22.

The configuration tool 52 may provide a single or integrated software tool that enables configuration of the communications protocol component 24, including the configurable communications modules 46a-n contained therein. Further, the configuration tool 52 may be an intuitive application running on one or more workstations, such as the operator station 14 (described above). More specifically, the configuration tool 52 may, for example, be implemented as a software program for use on a personal computer similar to the aforementioned AMS® software. The configuration of the process control system 10 (FIG. 1) and the device network 20 are incorporated into and managed with the database 18, which may be a single object-oriented database. When a single object-oriented database is implemented, the need for managing and synchronizing configuration data across multiple configuration databases is eliminated. However, an alternative or secondary database may be included with the I/O device 30 if desired.

As mentioned above, the configuration of the network 20 may be displayed as an easily understood hierarchy, and the configuration application 52 is self-documenting. Because the configuration of the network 20 is self-documenting, information related to the process control system 10 is readily available to the user and does not need to be translated when used by different views or divisions (i.e., maintenance, operations, etc.). For example, in some known systems, an operator configuring a communications channel for a particular field device may analyze the field device and consult secondary materials such as a workbook to determine what communications protocol to use to communicate with the field device as well as to access a variety of other information such as, for example, maintenance records for the device etc.

The example process control system 10 is self-documenting and, thus, each of the field devices 22 is adapted to provide information about itself via the communication channels or links 28. As a result, the field devices 22 may be accessed directly or auto-sensed when an auto-sense mechanism is integrated with the configuration application or tool 52 (as described below with FIG. 5). In any case, information relating to the field devices 22 may be readily displayed to the user via the configuration tool 52. Such information may include a device tag, maintenance information such as the last calibration, revisions or self-test information, or other operating information and/or instructions such as the appropriate communications protocol to be used to communicate with the device.

Figure 3:
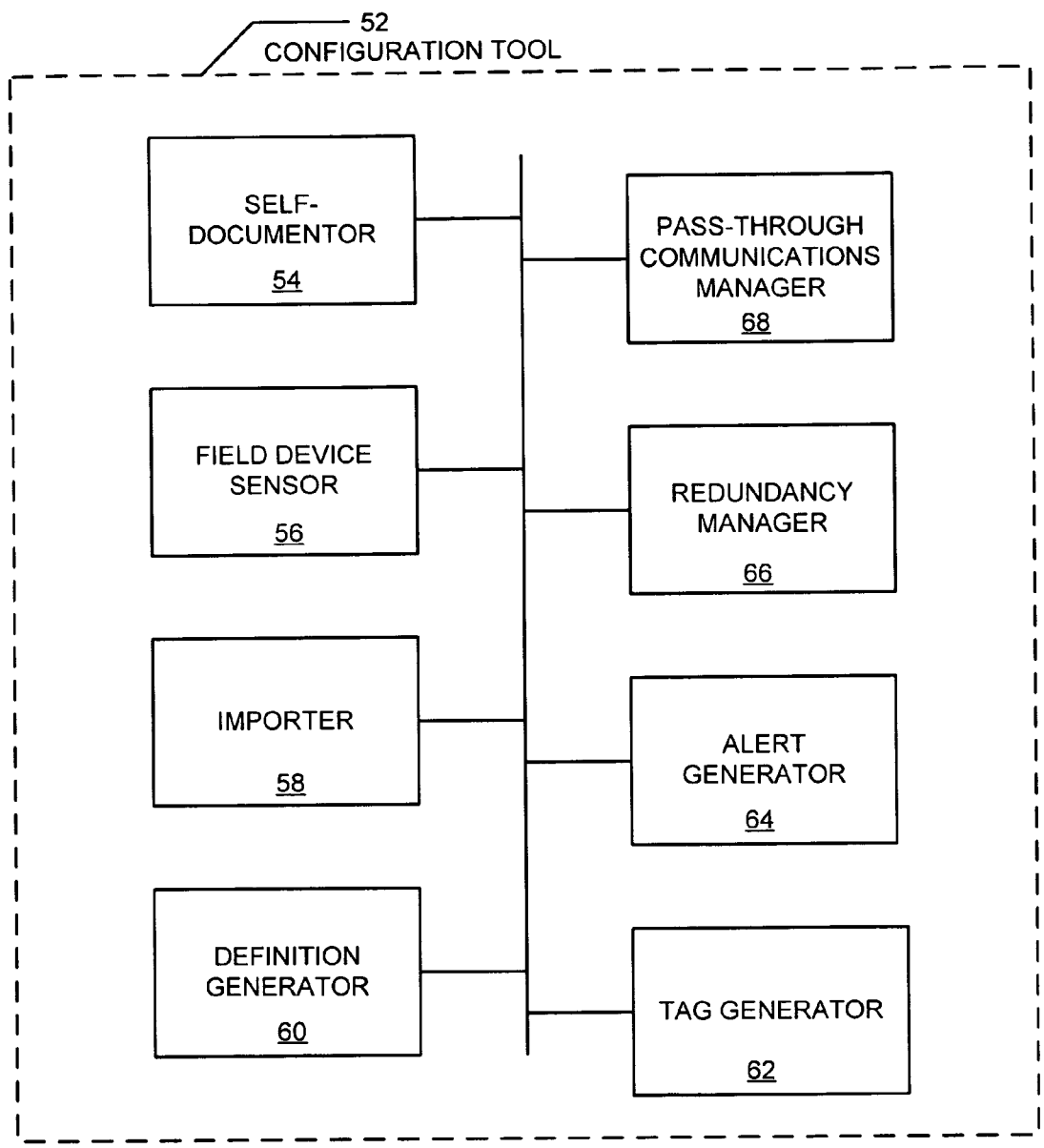
FIG. 3 is a detailed block diagram illustrating aspects of an example configuration tool described herein.

FIG. 3 is a block diagram illustrating aspects of the configuration tool or application 52 described herein. The functional blocks of FIG. 3 may be implemented using any desired combination of software, firmware, and hardware. For example, one ore more microprocessors, microcontrollers, application specific circuits (ASICs), etc. may access instructions and/or data stored on machine or processor accessible storage media to carry out the methods and to implement the apparatus described herein.

As shown in FIG. 3, the configuration tool 52 includes a self-documentor 54 that is used to document various information, statistics, facts, etc. relating to the configuration of field devices coupled to the process control system 10 (e.g., the field devices 22). The configuration tool 52 also has a field device sensor 56 that may sense the presence of one or more of the field devices 22 coupled to the process control system 10 and provide information related thereto. Further, the configuration tool 52 has an importer 58 that may be used to import device definitions and/or information related to creating device definitions into the database 18. The importer 58 may import such information in a bulk format or via a user initialized creation.

The configuration application 52 also includes a series of generators 60, 62 and 64. In particular, a definition generator 60 generates device definitions using product descriptions, which may be information imported by the importer 58. A tag generator 62 generates signal tags with labels that relate to the device definitions. Finally, an alert generator 64 generates alerts for one or more of the field devices 22 based upon the operational states of the relevant field devices 22. The device alerts may be generated on a per field device basis.

The configuration tool 52 also includes several other components including, without limitation, a redundancy manager 66 that may be used to support redundant I/O devices 30 and a passthrough communications manager 68, which enables the operator or field engineer to manage various aspects of the process control system 10 including device configuration and management, regardless of the implementation of the host process control system 10.

Figure 4:
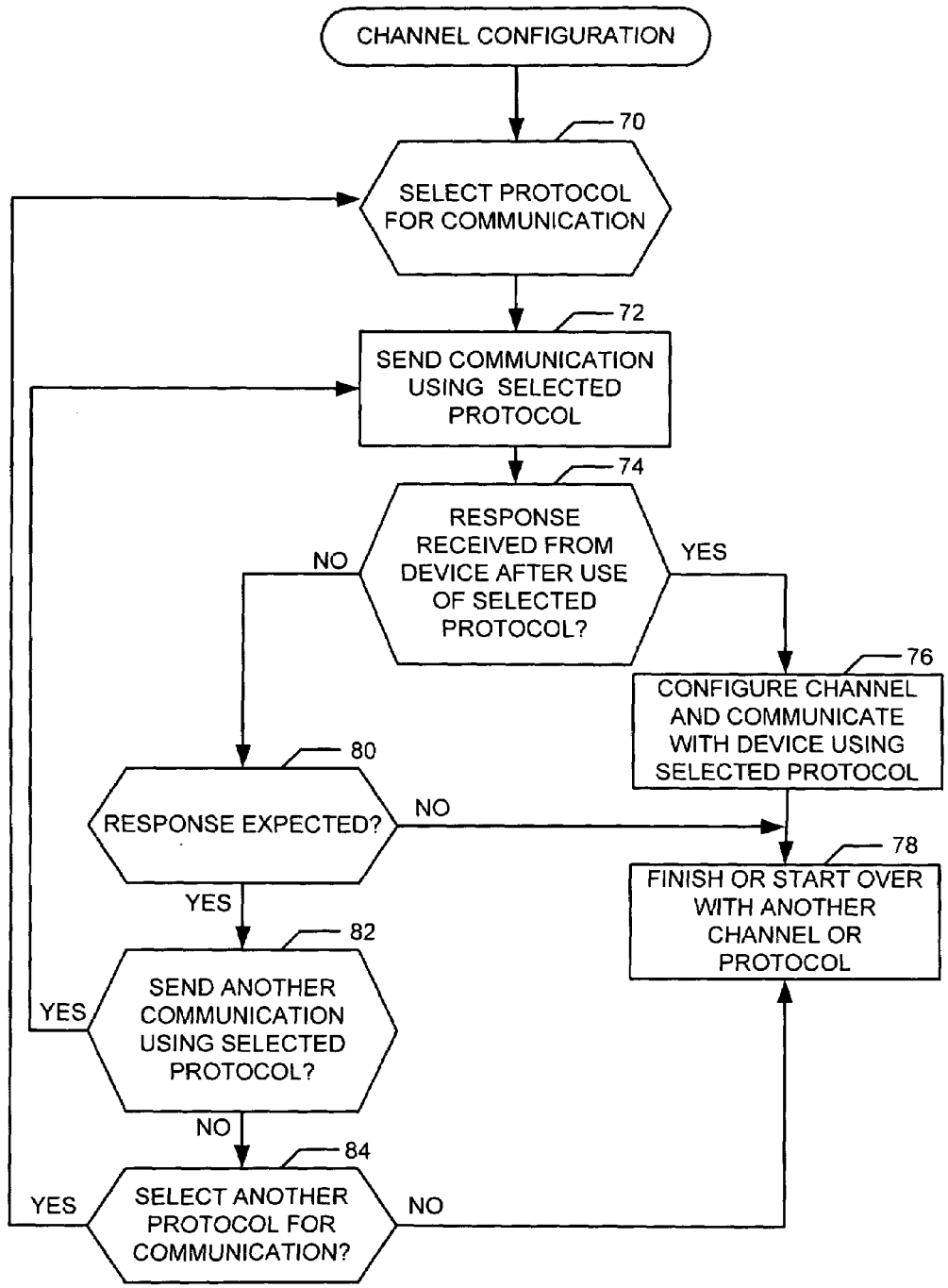
FIG. 4 is a flow diagram of an example process for controlling field devices in the example process control system of FIG. 1.
Figure 5:
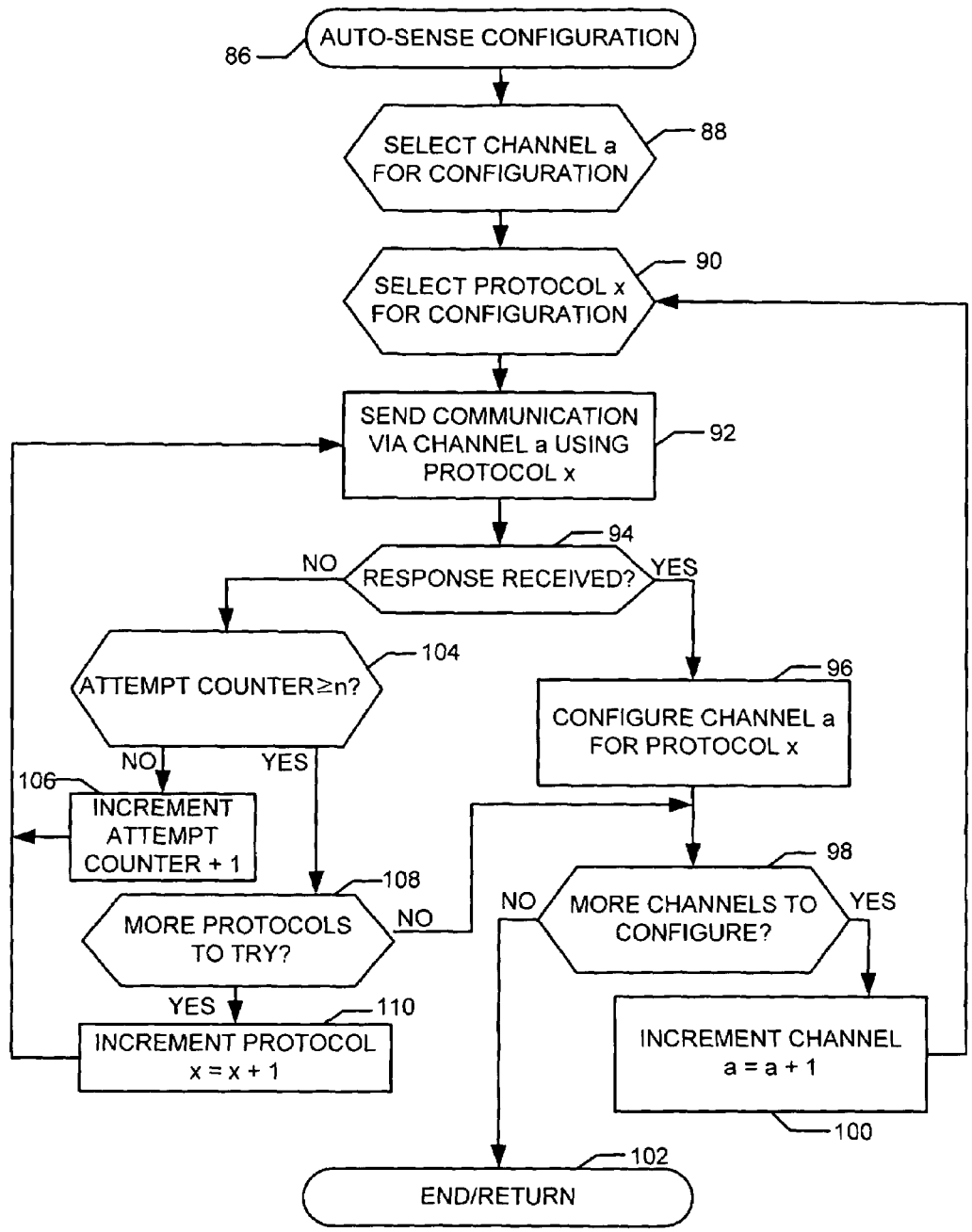
FIG. 5 is a flow diagram of an alternative example process for controlling field devices in the example process control system of FIG. 1.

FIGS. 4 and 5 depict flow diagrams of example methods that may be used to configure reconfigurable modules (e.g., modules 46a-n), ports (e.g., ports 48a-n) and communication links (e.g., communication channels 28a-n) in process control systems (e.g., the process control system 10 of FIGS. 1 and 2). In an example implementation, the flow diagrams of FIGS. 4 and 5 are representative of example machine readable and executable instructions for implementing the example configuration tool 52 of FIGS. 1-3. In the example implementation, the machine readable instructions comprise a program for execution by a processor such as the processor 212 shown in the example processor system 210 of FIG. 6. The program may be embodied in software stored on a tangible medium such as a CD-ROM, a floppy disk, a hard drive, a digital versatile disk ("DVD"), or a memory associated with the processor 212 and/or embodied in firmware or dedicated hardware in a well-known manner. For example, the configuration tool 52 (FIGS. 1-3), the I/O device, the controller, etc. could be implemented using software, hardware, and/or firmware. Further, although the example program is described with reference to the flowcharts illustrated in FIGS. 4 and 5, persons of ordinary skill in the art will readily appreciate that many other methods of implementing the configuration tool 52 may alternatively be used. For example, the order of execution of the blocks may be changed, and/or some of the blocks described may be changed, eliminated, or combined.

FIG. 4 outlines an example process that may be performed by the configuration tool 52 to control the plurality of field devices 22 via the flexible I/O device 30. As described herein, the communications protocol may be flexibly selected for each of the plurality of field devices 22 on a per channel or per connection basis. A configuration engineer or operator working at a workstation (e.g., the operator station 14) and implementing the configuration tool 52 may have information or data relating to the hierarchy and/or architecture of the process control system 10. That is, the operator may have knowledge or information concerning what field devices are installed and if and when a field device has been removed and/or replaced. Typically, a field device is only added, removed, replaced, etc., upon the issuance of a work permit or order. In the case that such a work permit or order is required, the operator typically possesses knowledge or information regarding the status, arrangement, and layout of the process control system 10. Based on this knowledge or information, the operator may be able to determine with substantial certainty what communications protocol is used to communicate with each of a plurality of field devices (e.g., the devices 22*a-n*) coupled to an I/O device (e.g., the I/O device 30) via a plurality of communication links (e.g., the communication channels 28*a-n*). In some instances, the operator may know precisely what type of field device (as well as its communications protocol) is coupled to a particular communications channel and, at other times, the operator may not have any knowledge or information of the configuration details of the process control system 10. In any event, the channel configuration tool 52 may be used to provide the operator with the information needed to enable proper configuration of the communication channels 28.

As shown in FIG. 4, for each communications channel 28, an operator selects a communications protocol for communication over the selected communications channel 28 (block 70). This may also be done randomly or using a predetermined sequence of communication protocols selected by the configuration tool 52. Once a communications protocol for the communications channel 28 is selected, the configuration tool 52 sends a message over the selected communications channel using the selected communications protocol (block 72). The message may be, for example, a command that requests a response by a field device 22 that is coupled to the communications channel 28 if the field device 22 understands (i.e., can process and interpret) the message. Thus, if the field device 22 does understand the message, and a response is received (block 74), which may, for example, provide signal tags and device specific information, the configuration tool 52 configures that communications channel 28 (including the associated port 48 and reconfigurable module 46) to communicate using that communications protocol, which enables the controller 12 to communicate with the field device 22 using a protocl the field device 22 understands (block 76). Once the communications channel 28 has been properly configured, the configuration tool 52 may proceed to evaluate another communications channel 28 (block 78) by returning control to block 70.

When, after sending a communication over the selected communications channel 28 with the selected communications protocol, the configuration tool 52 or operator does not receive a response (block 74), the configuration tool 52 or operator determines if a response was expected for that communications channel 28 (block 80). If a response was expected, i.e., the configuration tool 52 or the operator had pre-knowledge or information that a field device is (or should be) coupled to that communications channel 28 and, thus, expected to receive a response from that field device, the configuration tool 52 or operator can confirm that no field device is coupled to that communications channel 28 or that the field device 22 coupled thereto, if any, does not use the chosen communications protocol. Consequently, the configuration tool 52 or operator can begin the process again to either attempt configuration of a different communications channel 28 or attempt configuration of the same communications channel 28 again but with a different communications protocol (block 78).

If the configuration tool 52 or operator expected to receive a response over the communications channel 28 upon sending a message over the communications channel 28 using the communications protocol (block 80), then the configuration tool 52 or the operator expected a field device 22 to be coupled to that communications channel 28 that uses the selected communications protocol. This situation may lead to the generation of an alert (discussed above) to indicate that the results are not as expected. Also, this situation may indicate that there is no field device coupled to that communications channel 28 or, alternatively, if there is a field device 22 coupled thereto, that the field device 22 uses a communications protocol to communicate different than the communications protocol that was used to communicate over that communications channel 28 at block 74.

In addition, the configuration tool 52 or the operator may attempt configuration of the same communications channel 28 with the same protocol again (block 82) any number of times, for instance, until a desirable result (e.g., a field device response) is received. Alternatively, the configuration tool 52 or the operator can select another communications protocol (block 84) to use to communicate over the communications channel 28 to determine if a field device coupled to that communications channel 28 uses another communications protocol to communicate. Upon trying the same communications channel 28 with another communications protocol (block 84), the process begins again (block 70).

FIG. 5 is a flow diagram showing an alternative auto-sense configuration process 86 that may be performed by the configuration tool 52. In FIG. 5, the configuration tool 52 operates to automatically sense field devices and the associated communication protocols. During the auto-sense configuration process 86, the configuration tool 52 selects a communications channel, for example communications channel a, for configuration (block 88). The configuration tool 52 also selects a specific communications protocol, for example communications protocol x, with which to attempt communications over the selected communications channel (a) (block 90). Once the communications channel (a) and the communications protocol (x) are selected, the configuration tool 52 sends a communication via the communications channel (a) using the communications protocol (x) (block 92). The configuration tool 52 then determines if a response has been received (block 94).

If a response has been received (block 94), then the configuration tool 52 determines that the field device coupled to the communications channel (a) uses the communications protocol (x), and the configuration tool 52 configures the communications channel (a) for that communications protocol (x) (block 96). Upon configuration of the communications channel (a), the configuration tool 52 determines if there are more communication channels to configure (block 98). If there are no more communication channels to configure, the process 86 ends and/or returns to a calling process or routine (block 102).

On the other hand, if there are more communication channels to configure, then the configuration tool 52 proceeds to configure another communications channel, for example, communications channel a+1 (block 100) by choosing a communications protocol for that communications channel (a+1) (block 90) and sending a communication via the communications channel (a+1) using the communications protocol (x) (block 92). As stated above, the configuration tool 52 then determines if a response has been received (block 94).

If, after sending a communication over the communications channel (a), a response is not received at block 94, the configuration tool 52 determines if the most recent attempt at obtaining a response over the communications channel (a) using the communications protocol (x) is greater than or equal to or less than a pre-set number (n) of attempts (block 104). If the most recent attempt is less than the pre-set number (n) of attempts, then the attempt counter will increment by 1 (block 106), and the configuration tool 52 will again attempt to obtain a response by sending a communication via the communications channel (a) using the communications protocol (x) (block 92). However, if the attempt at communicating via the communications channel (a) using the communications protocol (x) is greater than or equal to the pre-set number (n) of allotted attempts (block 104), the configuration tool 52 will abort attempts at communicating via the communications channel (a) using the communications protocol (x). Typically, the attempt counter will not surpass the pre-set number (n). However, in the event of a system override or other disruption that may cause the configuration tool 52 to attempt communication n+1 or more times, the configuration tool 52 has the ability to abort attempting to configure the same communications channel using the same communications protocol when there has been no response.

After attempting communication to the communications channel (a) using the communications protocol (x) at least n times, the configuration tool 52 determines if there are more communication protocols to try (block 108) because the field device coupled to the communications channel (a) may use a communications protocol other than the communications protocol (x). If there are more communications protocols to try, the configuration tool 52 selects another communications protocol, for example communications protocol x+1 (block 110) and again sends a communication via the communications channel (a) using the different communications protocol (x+1). The configuration tool 52 may repeat this process for any number of communication protocols. If, after attempting communication via the communications channel (a) using the communications protocol (x) at least n times and determining that there are no more communication protocols to try (block 108), the configuration tool 52 determines if there are more communication channels to configure (block 98). If there are no more communication channels to configure, as stated above, the process 86 ends or returns to a calling process or routine (block 102). If there are more communication channels to configure, then the configuration tool 52 proceeds to configure another communications channel, for example, communications channel a+1 (block 100) by choosing a communications protocol for that communications channel (a+1) (block 90), sending a communication via the communications channel (a+1) using the communications protocol (x) (block 92) and proceeding through the process 86.

The methods described in FIGS. 4 and 5 may be implemented periodically to check for changes in the process control system 10. However, as stated above, the operator usually has pre-knowledge or information of the process control system 10 configuration and, thus, knows when a particular communications channel 28 should be configured or reconfigured. In addition, the configuration tool 52 may include a command to reconfigure all of the communication channels 28. Such a command requires the implementation of either method described with FIGS. 4 and 5 for each communications channel 28 in the process control system 10.

Figure 6:
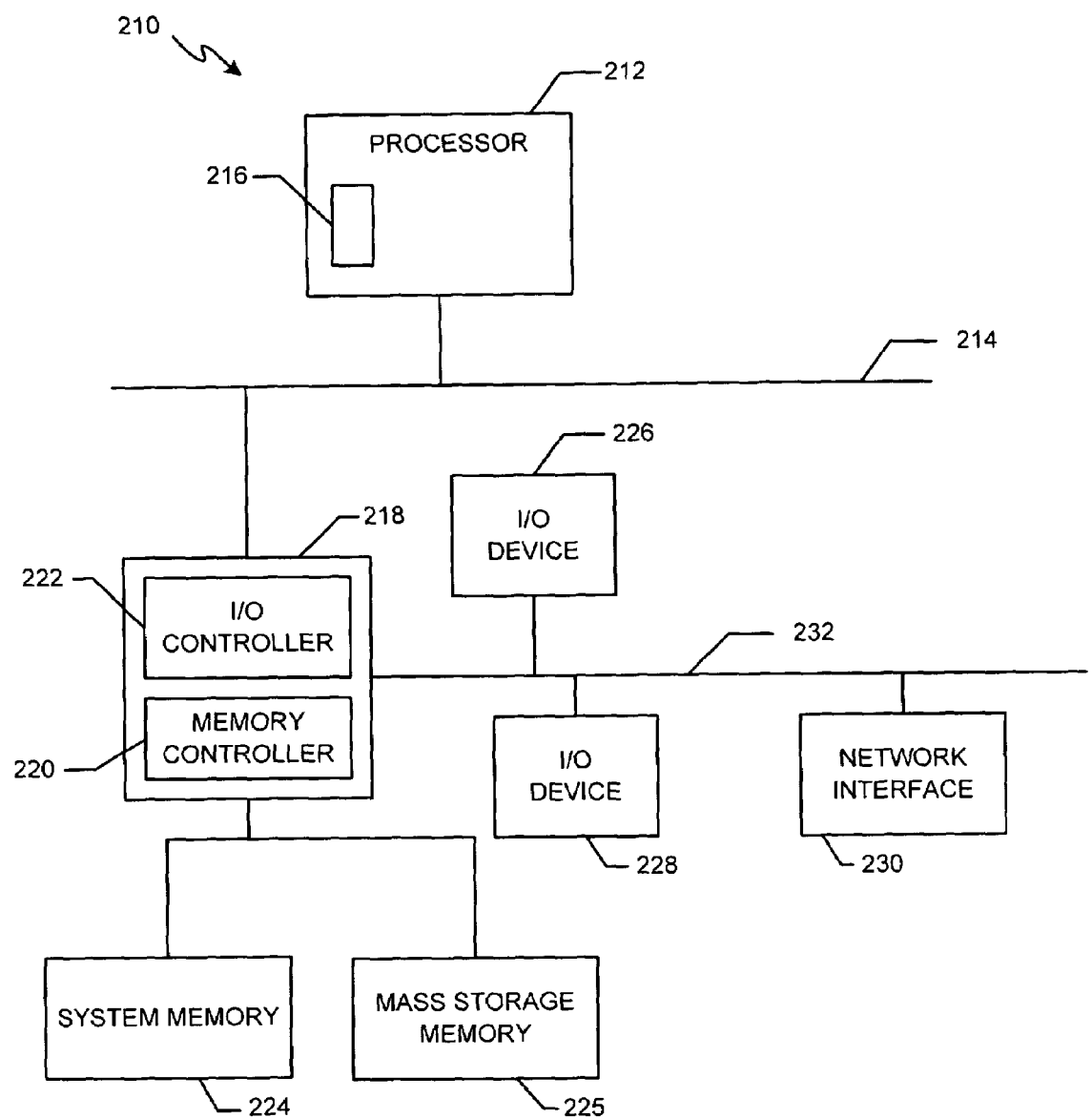
FIG. 6 is a schematic illustration of an example system that may be used and/or programmed to implement the example apparatus and methods described herein.

FIG. 6 is a block diagram of an example processor system that may be used to implement the example apparatus, methods, and articles of manufacture described herein with FIGS. 1-5. As shown in FIG. 6, the processor system 210 includes a processor 212 that is coupled to an interconnection bus 214. The processor 212 includes a register set or register space 216, which is depicted in FIG. 6 as being entirely on-chip, but which could alternatively be located entirely or partially off-chip and directly coupled to the processor 212 via dedicated electrical connections and/or via the interconnection bus 214. The processor 212 may be any suitable processor, processing unit or microprocessor. Although not shown in FIG. 6, the system 210 may be a multi-processor system and, thus, may include one or more additional processors that are identical or similar to the processor 212 and that are communicatively coupled to the interconnection bus 214.

The processor 212 of FIG. 6 is coupled to a chipset 218, which includes a memory controller 220 and an input/output ("I/O") controller 222. As is well known, a chipset typically provides I/O and memory management functions as well as a plurality of general purpose and/or special purpose registers, timers, etc. that are accessible or used by one or more processors coupled to the chipset 218. The memory controller 220 performs functions that enable the processor 212 (or processors if there are multiple processors) to access a system memory 224 and a mass storage memory 225.

The system memory 224 may include any desired type of volatile and/or non-volatile memory such as, for example, static random access memory ("SRAM"), dynamic random access memory ("DRAM"), flash memory, read-only memory ("ROM"), etc. The mass storage memory 225 may include any desired type of mass storage device including hard disk drives, optical drives, tape storage devices, etc.

The I/O controller 222 performs functions that enable the processor 212 to communicate with peripheral input/output ("I/O") devices 226 and 228 and a network interface 230 via an I/O bus 232. The I/O devices 226 and 228 may be any desired type of I/O device such as, for example, a keyboard, a video display or monitor, a mouse, etc. The network interface 230 may be, for example, an Ethernet device, an asynchronous transfer mode ("ATM") device, an 802.11 device, a DSL modem, a cable modem, a cellular modem, etc. that enables the processor system 210 to communicate with another processor system.

While the memory controller 220 and the I/O controller 222 are depicted in FIG. 6 as separate functional blocks within the chipset 218, the functions performed by these blocks may be integrated within a single semiconductor circuit or may be implemented using two or more separate integrated circuits.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A process control system to control a plurality of field devices, the process control system comprising:
   a control device; and
   an input/output card, the input/output card having a communication protocol component, the communication protocol component comprising:
      a first communications channel that is selectively configurable to use one of a plurality of communication protocols and to communicate with at least one of the field devices, and
      a second communications channel that is selectively configurable to use one of a plurality communication protocols and to communicate with at least one of the field devices,
      wherein the first channel, when configured to use a first communication protocol, communicates with a first one of the field devices while the second channel, when configured to use a second communication protocol, is enabled to simultaneously communicate with a second one of the field devices,
      wherein the second communication protocol is different than the first communication protocol,
      wherein each of the plurality of communications channels is coupled to a respective reconfigurable component of the communication protocol component and the reconfigurable components are configurable using a configuration application associated with the process control system, and
      wherein the configuration application is enabled to selectively and independently configure the reconfigurable components.

2. A process control system as defined in claim 1, wherein the first or the second communication protocol is selectable for each of a plurality of communications channels associated with the field devices.

3. A process control system as defined in claim 1, wherein the control device is configured to assign addresses to the field devices.

4. A process control system as defined in claim 1 further comprising a handheld configuration tool, wherein the handheld configuration tool is configured to assign addresses to the field devices.

5. A process control system as defined in claim 1, wherein the configuration application is created using one tool.

6. A process control system as defined in claim 5, wherein the one tool is an application configured to he executed via a workstation.

7. A process control system as defined in claim 1, wherein the configuration application is incorporated within an object-oriented database.

8. A process control system as defined in claim 1, wherein the configuration application is self-documenting.

9. A process control system as defined in claim 1, wherein the configuration application provides information related to the sensing of the field devices by the input/output card.

10. A process control system as defined in claim 1, wherein the configuration application is configured to clear address assignments of the field devices.

11. A process control system as defined in claim 1, wherein the configuration application is configured to use a device definition to describe an input, an output, or a parameter associated with a particular one of the field devices.

12. A process control system as defined in claim 11, wherein the device definition is imported into a configuration database in a bulk format or through a user creation.

13. A process control system as defined in claim 11, wherein the device definition is generated using a product description.

14. A process control system as defined in claim 11, wherein the device definition is created as the particular one of the field devices is added to the process control system.

15. A process control system as defined in claim 11, wherein cues for creating the device definition are provided to a user based on a communication protocol used to communicate with the particular one of the field devices.

16. A process control system as defined in claim 11, wherein the configuration application is configured to generate signal tags with labels related to the device definition.

17. A process control system as defined in claim 1, wherein the configuration application is configured to generate device alerts on a per field device basis for any one of a plurality of communication protocols used to communicate with the field devices.

18. A process control system as defined in claim 1, wherein the process control system is configured to use the input/output card and a redundant input/output card.

19. A process control system as defined in claim 1, wherein the configuration application supports pass-through communications from a workstation-based device configuration application.

20. A process control system as defined in claim 1 further comprising a redundant input/output card, the redundant input/output card having a second communication protocol component, the second communication protocol component comprising:
   a third communications channel that is selectively configurable to use one of a plurality of communication protocols and to communicate with at least one of the field devices, and
   a fourth communications channel that is selectively configurable to use one of a plurality communication protocols and to communicate with at least one of the field devices, and
   wherein the third channel, when configured to use the first communication protocol, communicates with the first one of the field devices or a third one of the field devices, while the fourth channel, when configured to use the second communication protocol, is enabled to simultaneously communicate with the second one of the field devices or a fourth one of the field devices,
   wherein each of the plurality of communications channels is coupled to a respective reconfigurable component of the second communication protocol component and the reconfigurable components are configurable using a configuration application associated with the process control system, and
   wherein the configuration application is enabled to selectively and independently configure the reconfigurable components.

21. A process control system as defined in claim 1, wherein the communications protocol component further comprises:
   a third communications channel that is selectively configurable to use one of a plurality of communication protocols and to communicate with at least one of the field devices,
   wherein the third channel, when configured to use a third communication protocol, communicates with a third one of the field devices while the first channel, when configured to use the first communication protocol, is enabled to simultaneously communicate with the first one of the field devices, and the second channel, when configured to use the second communication protocol, is enabled to simultaneously communicate with the second one of the field devices, wherein the third communication protocol is different than the first communication protocol and the second communication protocol, and wherein the third channel is coupled to a respective reconfigurable component of the communications protocol component that is selectively and independently configurable using a configuration application associated with the process control system.

22. A process control system as defined in claim 21 further comprising a redundant input/output card, the redundant input/output card having a second communication protocol component, the second communication protocol component comprising:

a fourth communications channel that is selectively configurable to use one of a plurality of communication protocols and to communicate with at least one of the field devices, a fifth communications channel that is selectively configurable to use one of a plurality communication protocols and to communicate with at least one of the field devices, and a sixth communications channel that is selectively configurable to use one of a plurality communication protocols and to communicate with at least one of the field devices, wherein the fourth channel, when configured to use the first communication protocol, communicates with the first one of the field devices or a fourth one of the field devices, while the fifth channel, when configured to use the second communication protocol, is enabled to simultaneously communicate with the second one of the field devices or a fifth one of the field devices, while the sixth channel, when configured to use the third communication protocol, is enabled to simultaneously communicate with the third one of the field devices or a sixth one of the field devices, wherein each of the plurality of communications channels is coupled to a respective reconfigurable component of the second communication protocol component and the reconfigurable components are configurable using a configuration application associated with the process control system, and wherein the configuration application is enabled to selectively and independently configure the reconfigurable components.

23. An input/output card for use in a process control system, the input/output card comprising:

a communication protocol component comprising:

a first communications channel to establish communications between at least one of a plurality of field devices and a control device using a first of one of a plurality of available communication protocols, and a second communications channel to simultaneously establish communications between at least another of the plurality of field devices and the control device using a second one of the plurality of available communication protocols, wherein the second communication protocol is different than the first communication protocol, wherein each of the plurality of communications channels is coupled to a respective reconfigurable component of the communication protocol component and the reconfigurable components are configurable using a configuration application associated with the process control system, and wherein the configuration application is enabled to selectively and independently configure the reconfigurable components.

24. An input/output card as defined in claim 23, wherein the first or second communication protocol is selectable for each of the plurality of field devices.

25. An input/output card as defined in claim 23, wherein the input/output card is configurable remotely.

26. An input/output card as defined in claim 23, wherein the input/output card is configured to automatically sense the field devices.

27. A method of controlling a plurality of field devices, the method comprising:

initializing an input/output card that includes a communication protocol component having a plurality of reconfigurable components that are respectively coupled to a plurality of communications channels;

configuring the reconfigurable components of the communication protocol component by extending a configuration application associated with a control system, wherein the configuration application is enabled to selectively and independently configure the reconfigurable components;

configuring a first communications channel of the plurality of communications channels to use a first of a plurality of available communication protocols; and configuring a second communications channel of the plurality of communications channels to use a second of the plurality of available communication protocols, wherein the second communication protocol is different than the first communication protocol;

communicating with one of the field devices via the first communications channel using the first communication protocol; and simultaneously communicating with another of the field devices via the second communications channel using the second communication protocol.

28. A method as defined in claim 27 further comprising selectively configuring the input/output card to use the first communication protocol or the second communication protocol for each of the plurality of field devices.

29. A method as defined in claim 27 further comprising using a control device to assign addresses to the field devices.

30. A method as defined in claim 27 further comprising using a handheld configuration tool to assign addresses to the field devices when a control system is offline.

31. A method as defined in claim 27 further comprising creating the configuration application using a single tool.

32. A method as defined in claim 31, wherein the single tool is an application running on a workstation.

33. A method as defined in claim 27 further comprising incorporating the configuration application into a single object-oriented database.

34. A method as defined in claim 27, wherein the configuration application is self-documenting.

35. A method as defined in claim 27 further comprising using the configuration application to provide information related to the sensing of the field devices by an interface card.

36. A method as defined in claim 27 further comprising using the configuration application to clear address assignments of the field devices.

37. A method as defined in claim 27, wherein the configuration application uses a device definition to describe an input, an output, or a parameter of a particular one of the field devices.

38. A method as defined in claim 37 further comprising importing the device definition into a configuration database in a bulk format or via an interaction with a user.

39. A method as defined in claim 38, wherein the user creates the device definition from a product description.

40. A method as defined in claim 37, wherein the user creates the device definition as the particular one of the field devices is added to the control system.

41. A method as defined in claim 37 further comprising providing cues for creating the device definition to the user based on the communication protocol used to communicate with the particular one of the field devices.

42. A method as defined in claim 37 further comprising using the configuration application to generate signal tags with labels related to the device definition.

43. A method as defined in claim 27 further comprising using the configuration application to generate device alerts on a per field device basis for any one of a plurality of communication protocols.

44. A method as defined in claim 27 further comprising supporting redundant interface cards.

45. A method as defined in claim 27 further comprising supporting pass-through communications from a workstation-based device configuration application.

46. A machine accessible storage device or storage disc comprising instructions that, when executed, cause a machine to control at least one of a plurality of field devices by:
   initializing an input/output card that includes a communication protocol component having a plurality of reconfigurable components that are respectively coupled to a plurality of communications channels;
   configuring the communication protocol component by extending a configuration application associated with a control system, wherein the configuration application is enabled to selectively and independently configure the reconfigurable components;
   configuring a first communications channel of the plurality of communications channels to use a first of a plurality of available communication protocols; and
   configuring a second communications channel of the plurality of communications channels to use a second of the plurality of available communication protocols, wherein the second communication protocol is different than the first communication protocol;
   communicating with one of the field devices via the first communications channel using the first communication protocol; and
   simultaneously communicating with another of the field devices via the second communications channel using the second communication protocol.

47. A machine accessible storage device or storage disc as defined in claim 46, wherein the instructions, when executed cause the machine to select the first communication protocol or the second communication protocol for each of the plurality of field devices.

48. A machine accessible storage device or storage disc as defined in claim 46, wherein the instructions, when executed cause the machine to use a control device to assign addresses to the field devices.

49. A machine accessible storage device or storage disc as defined in claim 46, wherein the instructions, when executed cause the machine to communicate with a handheld configuration tool to assign addresses to the field devices when a control system is offline.

50. A machine accessible storage device or storage disc as defined in claim 46, wherein the instructions, when executed cause the machine to create the configuration application using a single tool.

51. A machine accessible storage device or storage disc as defined in claim 50, wherein the single tool is an application running on a workstation.

52. A machine accessible storage device or storage disc as defined in claim 46, wherein the instructions, when executed cause the machine to incorporate the configuration application into a single object-oriented database.

53. A machine accessible storage device or storage disc as defined in claim 46, wherein the configuration application is self-documenting.

54. A machine accessible storage device or storage disc as defined in claim 46, wherein the instructions, when executed cause the machine to use the configuration application to provide information related to the sensing of the field devices by an interface card.

55. A machine accessible storage device or storage disc as defined in claim 46, wherein the instructions, when executed cause the machine to use the configuration application to clear address assignments of the field devices.

56. A machine accessible storage device or storage disc as defined in claim 46, wherein the configuration application uses a device definition that describes an input, an output, or a parameter associated with a particular one of the field devices.

57. A machine accessible storage device or storage disc as defined in claim 56, wherein the instructions, when executed cause the machine to import the device definition into a configuration database in a bulk format via interaction with a user.

58. A machine accessible storage device or storage disc as defined in claim 57, wherein the device definition is user generated from a product description.

59. A machine accessible storage device or storage disc as defined in claim 56, wherein the user creates the device definition as the one of the particular field devices is added to the process control system.

60. A machine accessible storage device or storage disc as defined in claim 56, wherein the instructions, when executed cause the machine to provide cues for creating the device definition to the user based on the communication protocol used to communicate with the particular one of the field devices.

61. A machine accessible storage device or storage disc as defined in claim 56, wherein the instructions, when executed cause the machine to use the configuration application to generate signal tags with labels related to the device definition.

62. A machine accessible storage device or storage disc as defined in claim 46, wherein the instructions, when executed cause the machine to use the configuration application to generate device alerts on a per field device basis for any one of a plurality of communication protocols.

63. A machine accessible storage device or storage disc as defined in claim 46, wherein the instructions, when executed cause the machine to support redundant interface cards.

64. A machine accessible storage device or storage disc as defined in claim 46, wherein the instructions, when executed cause the machine to support pass-through communications from a workstation-based device configuration application.

65. A method of using an input/output card including a communication protocol component having a plurality of reconfigurable components respectively coupled to a plurality of communications channels in a process control system to communicate using a plurality of communication protocols, the method comprising:
- configuring the communication protocol component by extending a configuration application associated with a control system, wherein the configuration application is enabled to selectively and independently configure the reconfigurable components of the input/output card;
- configuring at least first one of a plurality of communications channels of the input-output card to communicate with at least one of a plurality of field devices using a first communication protocol; and
- configuring at least a second one of the plurality of communications channels of the input-output card to communicate with at least another one of the plurality of field devices using a second communication protocol, wherein the first and second communications channels are to use the first and second communication protocols, respectively, simultaneously, wherein the second communication protocol is different than the first communication protocol.

66. A method as defined in claim 65 further comprising selecting the first communication protocol or the second communication protocol for any of the plurality of field devices on a per connection basis.

67. A method as defined in claim 65 further comprising configuring the input/output card remotely.

68. A method as defined in claim 65, wherein the input/output card is configured to automatically sense the field devices.

* * * * *